Dec. 30, 1930.　　　C. E. E. WOLFERMANN　　　1,786,927
COLLAPSIBLE ROOF BODY FOR AUTOMOBILES
Filed Jan. 28, 1928
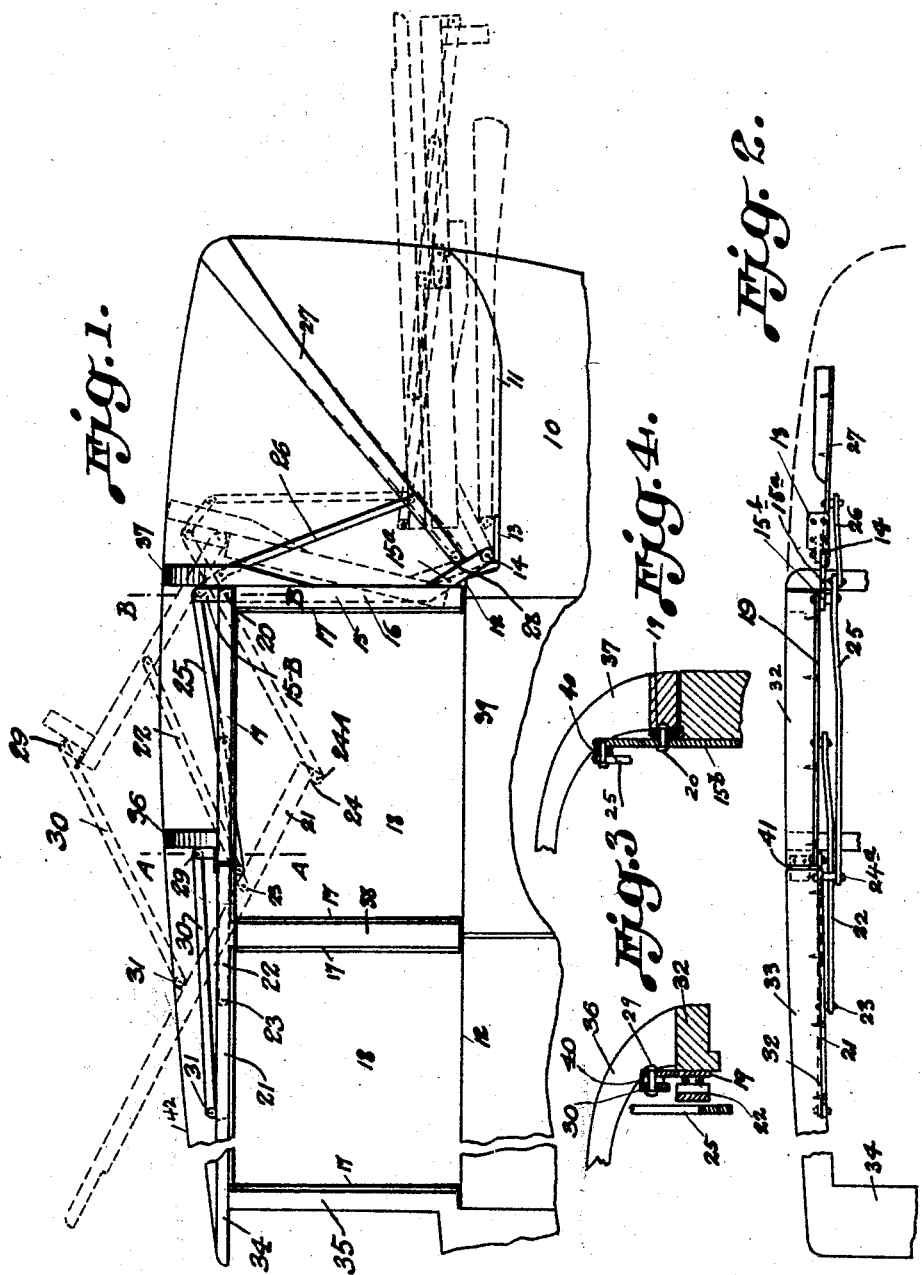
Carl. E. E. Wolfermann.
INVENTOR.

Patented Dec. 30, 1930

1,786,927

UNITED STATES PATENT OFFICE

CARL E. E. WOLFERMANN, OF NEW YORK, N. Y.

COLLAPSIBLE ROOF BODY FOR AUTOMOBILES

Application filed January 28, 1928. Serial No. 250,178.

This invention relates to roof bodies and it particularly relates to collapsible roof bodies for automobiles or other vehicles, which will allow to use the automobile at will either as a closed or open car.

In view of its purposes the roof body consists of the parts described below, the said parts being arranged in relation to each other so as to allow the dropping and raising of the windows of the door and of the sides of the automobile as the weather may make desirable. Moreover, it is an essential feature of the constructive arrangement of the members constituting the front part of the roof that they extend on each side in one horizontal line and that in this particular position they form such a rugged construction that the roof is prevented absolutely from sagging down, even the weight of a man having no downward pulling effect on the roof in this position. It is a further object of the invention to arrange a collapsible roof in such relation to the body of the automobile that the roof in collapsed state does not prevent the passengers on the rear seat from having a full view of the surroundings inasmuch as the body of the car for this purpose is made somewhat lower at its rear end so as to bring the upper rim of the folded body only a little above the main stream line of the car body.

With these ends in view the invention will be more fully described below and illustrated by the accompanying drawings, in which Fig. 1 is a side elevation of the collapsible roof body mounted on an automobile body, the figure showing the collapsible roof body in dashed lines in the state of being folded and furthermore the folded roof body on the rear part of the automobile. The upper part of the auto body is shown in a fragmentary view.

Fig. 2 is a view of the collapsible roof body, seen from below.

Fig. 3 is a front view of a transverse vertical section on the line A—A of Figure 1.

Fig. 4 is a front view of a transverse vertical section on the line B—B of Figure 1.

Like numerals denote like parts all through the various figures.

In the drawing the numeral 10 denotes the car body proper, the rear part of which has a curved recess 11, disposed somewhat below the stream line 12 of body 10. In the front corner of that recess 11 a metal plate 13 with a projection 14 is rigidly secured by suitable means to the body 10 and a brace iron, or brace 15, of flat iron, or steel, or other suitable metal, bent into a shorter arm 15a and a longer arm 15b, is with its short arm pivoted to the projection 14; if the longer arm 15b is erected perpendicularly, the short arm 15a reaches only immediately above the stream line 12. A relatively broad wooden rail 16 is secured to the outside of the brace 15. This rail 16 is exactly the same length as the height of the window pane 18 of the door and is provided at its front side, adjoining the door, with a suitable guide 17 so as to allow the window pane 18 to slide against the same. Shortly below the upper end of the arm 15b and directly above the wooden rail 16 a horizontally disposed brace 19 is hingedly secured outside at 20 to said arm 15b. A brace 21 serves as an extension to the brace 19 and is linked with the same by the link 22, the hinged connection of the same with the brace 19 is disposed at about the middle of the same and the hinged connection with the brace 21 is made at 23 a short distance from its rear end.

The extension brace 21 is furthermore provided at its rear end with a downward projection or a lug 24 from which a pin 24a projects horizontally inwardly. By means of said pin 24a the double bent lever 25 is hingedly connected to the brace 21, the lever 25 being hingedly connected intermediate its end with the brace 15 on the inside of the same. The short arm of the lever 25 is hingedly connected with the upper end of the link 26; this in turn is hingedly connected with the rear bow 27 hingedly connected with a lug 28 arranged on the rear side of the short arm 15a of the brace 15. At its front end the rail 19 projects upwardly for a short distance, the end 29 of which is hingedly connected by the link 30 with a lug 31 arranged on the upper side of the rail 21.

The outside of the rail 19 is covered with a wooden brace 32 and the brace 21 with the wooden rail 33 to which the wooden front brace 34 of the roof is joined in any of the well known ways. This front rail can be joined in any of the well known ways to the wind-shield 35 which is fixed permanently in its place, for instance perpendicularly, as shown, or in any inclined position as may be desirable.

A wooden bow 36 is mounted in any of the well known ways upon the wooden rail 32 at the front end of the same and a similar wooden bow 37 is rigidly secured by screws or other suitable means to the rear side of the wooden rail 16. Below the brace 21 on each side of the car a pillar 38 is arranged in such manner that it either is hingedly secured to the inside of the car body, or, if this manner of fastening the pillar to the body is inconvenient on account of the driver's seat and of the lower part of the door 39, it may be arranged in such way that it can easily be taken out and put away until it is again needed. The pillar 38 is furthermore provided on its narrow sides with guides 17 and such guides 17 are also provided on the rear side of the frame of the wind shield 35 so as to have the window panes 18 properly held when dropped or raised by some suitable mechanism (not shown).

From an inspection of the drawing, particularly Figure 2, it will be noticed that in the unfolded roof the link 22 is disposed between the linearly arranged braces 19, 21 and the lever 25 and in order to facilitate a smooth folding of each of the various rails into its respective location, washers 40 are interposed between the joined members, for instance the joints of parts 21 and 22, 19 and 22, 21 and 25, 25 and 15, 26 and 27; these washers are, however, only specifically pointed out in the Figures 3 and 4. The weight of the brace 21 and of the wooden rails 33 and 34 secured thereto is safely held by the links 30, 22 and lever 25, and to keep down the end of the wooden rail 33 a heavy metal plate 41 is rigidly secured on top of the front end of the wooden rail 32 in such manner that one half of the metal plate 41 overlaps on the wooden rail 33 and presses down the rear end of the same when the collapsible roof is unfolded. A cover 42 of leather, or cloth or other suitable material is stretched over the roof, being secured to the wooden rails and the body of the car in any of the ways known to the art.

The operation of the collapsible roof body is easily understood by an inspection of the dashed lines in the middle of the Figure 1 which show that upon lifting the front rail 34 and pushing it rearwardly the rear bow 27 is pressed downwardly by yielding to the pressure of the braces 15 and 19 transmitted to them by the interaction of the parts 25, 22 and 30 connecting the same with brace 21; both braces 19 and 21 on the one side and the link 30 and front part of lever 25 on the other move parallel to each other and form together a parallelogram at any stage during the collapse of the roof body, while the link 22 is parallel to the link 30 and front part of lever 25 and therefore moves always in the same spaced relation with the same.

It is understood that various members could be shaped differently without deviating from the constructive principle of the invention, for instance the short arm 15a of the supporting rail 15 could be slightly curved instead of being straight so as to have the form of a fork.

What I claim is:

1. In a collapsible roof for automobiles and similar vehicles the combination with a car body, having a downwardly extending recess at its rear end, of a double bent brace hingedly secured to the car body by its short arm and having its long arm disposed perpendicularly, a rear bow hingedly secured to the rear side of aforesaid short arm, a horizontally disposed brace hingedly secured to the outside and shortly below the upper end of aforesaid perpendicular arm, having an upwardly disposed projection at its front end, and an extention brace linearly arranged with aforesaid horizontal brace having a downwardly extending projection at its rear end, a horizontally disposed link hingedly connecting both the aforesaid horizontal rail and the extension brace, a double bent lever hingedly secured at its bend to the inside of the upper end of aforesaid brace, and with its front end to aforesaid extension braces at the end of its downwardly extending projection, a link hingedly connecting the rear bow with the end of the short arm of aforesaid lever, and a link hingedly connecting the upper end of the upwardly projection of the horizontally disposed rail with the extension brace.

2. In a collapsible roof for automobiles and similar vehicles the combination with a car body, having a downwardly extending recess at its rear end, of a double bent brace hingedly secured to the car body by its short arm and having its long arm disposed perpendicularly, a rear bow hingedly secured to the rear side of aforesaid short arm, a horizontally disposed brace hingedly secured to the outside and shortly below the upper end of aforesaid brace having an upwardly disposed projection at its front end, an extension brace linearly arranged with aforesaid horizontal brace, having a downwardly extending projection at its rear end, a horizontally disposed link hingedly connecting both the aforesaid horizontal and the extension braces, a double bent lever, hingedly secured at its bend to the inside of the upper end of aforesaid brace and with its front end to aforesaid extension brace at the end of its downwardly extending projection, a link hingedly connecting the rear bow with the end of the short arm of aforesaid lever, a link, hingedly connecting the upper end of the upward projection of the horizontally disposed rail, a wooden rail secured to and covering the outside of aforesaid perpendicular arm, a wooden rail secured to the outside of the aforesaid horizontally disposed rail, a wooden rail secured to the outside of the extension rail, a wooden front rail secured to that of the extension rail, a wooden bow rigidly secured to the wooden rail secured to the horizontally disposed rail, and a wooden bow rigidly secured to the rear side of the wooden rail covering the outside of the perpendicular arm.

3. In a collapsible roof body, the combination comprising a double bent brace hingedly secured to the car body by its short arm and having its long arm disposed perpendicularly, a horizontally disposed brace hingedly secured to the outside of and shortly below the upper end of aforesaid perpendicular arm, an extension brace in alignment with aforesaid brace, a horizontally disposed link hingedly connecting both the aforesaid horizontal and the extension brace, a double bent lever hingedly secured at its bend to the inside of the upper end of aforesaid brace and with its front end to aforesaid extension brace, and a link hingedly connecting the horizontally disposed brace with the extension brace, the braces being disposed parallel to each other at any stage during the collapse and connected by the aforesaid links and the front part of the aforesaid lever to form a parallelogram.

In witness whereof, I have hereunto set my hand.

CARL E. E. WOLFERMANN.